United States Patent
Collins et al.

(10) Patent No.: US 8,622,129 B2
(45) Date of Patent: Jan. 7, 2014

(54) METHOD OF INJECTING CARBON DIOXIDE

(75) Inventors: Ian Ralph Collins, Middlesex (GB); Andrew Russell Mason, Aberdeenshire (GB)

(73) Assignee: BP Exploration Operating Company Limited, Middlesex (GB)

(*) Notice: Subject to any disclaimer, the term of this patent is extended or adjusted under 35 U.S.C. 154(b) by 427 days.

(21) Appl. No.: 12/734,521

(22) PCT Filed: Oct. 30, 2008

(86) PCT No.: PCT/GB2008/003684
§ 371 (c)(1),
(2), (4) Date: Jul. 7, 2010

(87) PCT Pub. No.: WO2009/060177
PCT Pub. Date: May 14, 2009

(65) Prior Publication Data
US 2012/0090838 A1      Apr. 19, 2012

(30) Foreign Application Priority Data

Nov. 6, 2007   (EP) .................................... 07254378

(51) Int. Cl.
*E21B 43/16*      (2006.01)
(52) U.S. Cl.
USPC ............ 166/266; 166/267; 166/371; 166/402
(58) Field of Classification Search
USPC .................................. 166/266, 402, 267, 371
See application file for complete search history.

(56) References Cited

U.S. PATENT DOCUMENTS

| 2,724,438 A | 11/1955 | Whorton et al. |
| 2,279,291 A | 1/1956 | Haverfield |
| 3,351,132 A | 11/1967 | Lynn et al. |

(Continued)

FOREIGN PATENT DOCUMENTS

| CA | 627357 | 9/1961 |
| CA | 823962 | 9/1969 |

(Continued)

OTHER PUBLICATIONS

International Search Report for PCT/GB2008/003684, mailed Apr. 2, 2009.

(Continued)

*Primary Examiner* — Zakiya W Bates
*Assistant Examiner* — Silvana Runyan
(74) *Attorney, Agent, or Firm* — Nixon & Vanderhye

(57) ABSTRACT

A method of storing $CO_2$ in a porous and permeable hydrocarbon reservoir having at least one injection well and at least one production well penetrating the reservoir, by recovering a produced fluid stream including produced hydrocarbons, produced water, and produced $CO_2$ from the production well; passing the produced fluid stream to a production facility where a produced vapor stream of carbon dioxide and volatile hydrocarbons is separated from the produced fluid stream; compressing the produced vapor stream to above the cricondenbar for the produced vapor stream; cooling the compressed stream to form a cooled stream that in a dense phase state; importing a $CO_2$ stream to an injection facility wherein the imported $CO_2$ is either in a liquid state or a supercritical state; mixing the cooled stream with the imported $CO_2$ stream thereby forming a co-injection stream; and injecting the co-injection stream into the hydrocarbon bearing reservoir from said injection well.

23 Claims, 1 Drawing Sheet

(56) References Cited

U.S. PATENT DOCUMENTS

| | | | |
|---|---|---|---|
| 3,687,198 A | | 8/1972 | Hearn et al. |
| 6,808,693 B2 * | | 10/2004 | Arnaud et al. ................ 423/212 |
| RE39,244 E * | | 8/2006 | Eaton ....................... 405/129.28 |
| 2002/0036086 A1 | | 3/2002 | Minkkinen et al. |
| 2003/0131726 A1 * | | 7/2003 | Thomas et al. ................... 95/49 |
| 2004/0200618 A1 | | 10/2004 | Piekenbrock |
| 2005/0167103 A1 | | 8/2005 | Horner et al. |
| 2007/0261844 A1 * | | 11/2007 | Cogliandro et al. .......... 166/248 |

FOREIGN PATENT DOCUMENTS

| | | |
|---|---|---|
| EP | 1 378 627 | 1/2004 |
| RU | 2 093 444 | 10/1997 |
| WO | 2005/059433 | 6/2005 |
| WO | 2006/000663 | 1/2006 |
| WO | 2007/077137 | 7/2007 |
| WO | 2007/133461 | 11/2007 |
| WO | 2008/009930 | 1/2008 |

OTHER PUBLICATIONS

Written Opinion of the International Searching Authority for PCT/GB2008/003684, mailed Apr. 2, 2009.
Jaud et al., "Technico-economic Feasibility Study of Co2 Capture, Transport and Geo-Sequestriation: a Case Study for France", Greenhouse Gas Control Technologies, Sep. 1, 2005, XP008089547.
Carroll et al., "Design Consideration s for Acid Gas Injection", Laurance Reid Gas Conditioning Conference, Oklahoma, US, Feb. 1999, pp. 1-26, XP002312121.

\* cited by examiner

Fig. 1 Phase Envelope (multi-component system)
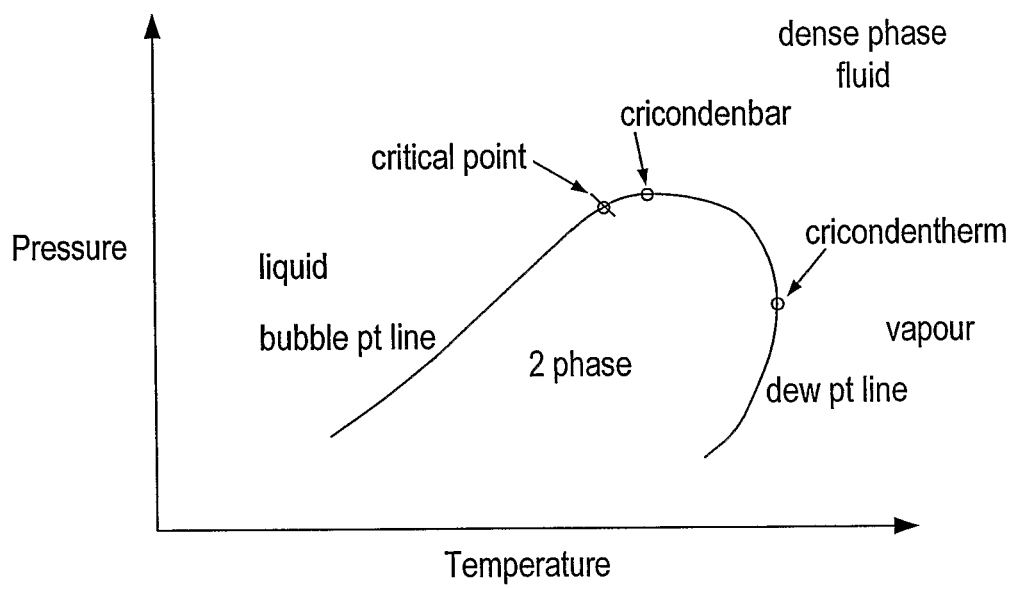
Fig. 2
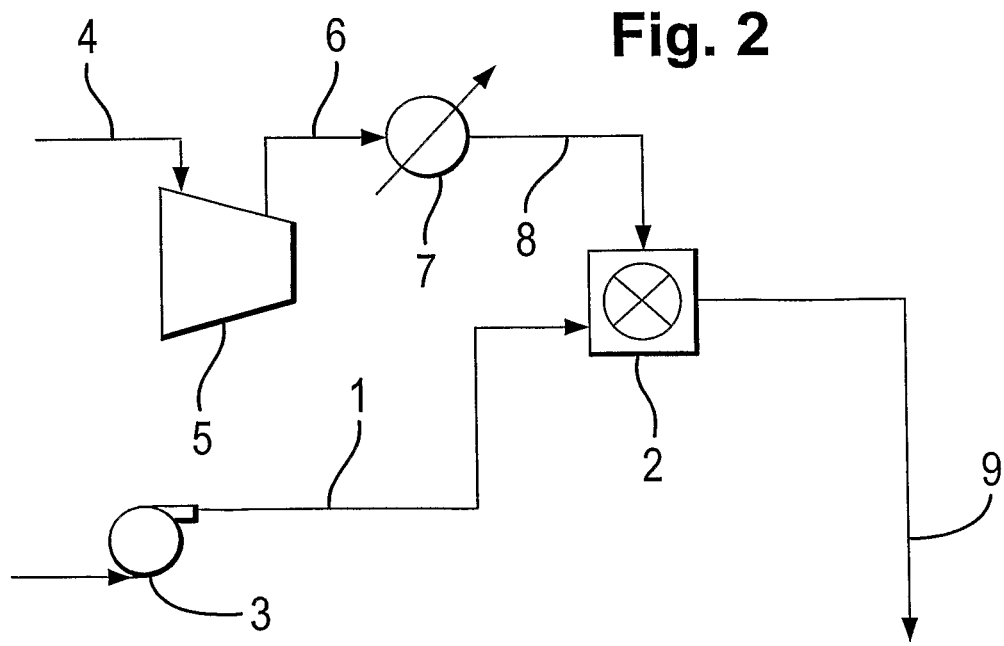

METHOD OF INJECTING CARBON DIOXIDE

This application is the U.S. national phase of International Application No. PCT/GB2008/003684, filed 30 Oct. 2008, which designated the U.S. and claims priority to European Application No. 07254378.8, filed 6 Nov. 2007, the entire contents of each of which are hereby incorporated by reference.

The present invention relates to storage of carbon dioxide ($CO_2$) in a porous and permeable subterranean reservoir, and, in particular, to the injection of $CO_2$ into a hydrocarbon reservoir for storage of the $CO_2$ therein.

BACKGROUND OF THE INVENTION $CO_2$ is a gas produced as a by-product, in large quantities, in certain industrial operations, e.g. the manufacture of ammonia, in power plants that burn fossil fuels such as coal, oil or gas, and in a hydrogen plant that produces hydrogen by reforming of a hydrocarbon feedstock. Release of this by-product into the atmosphere is undesirable as it is a greenhouse gas. Much effort has been made towards the development of methods for the disposal of $CO_2$ in a way other than release to the atmosphere. One technique of particular interest is subsurface disposal of $CO_2$ into caverns or porous strata. Beneficial advantage of disposal can be realised if the $CO_2$ is injected into a porous and permeable hydrocarbon reservoir where the injected $CO_2$ serves to drive hydrocarbons (e.g. oil) in the reservoir towards a production well (a well from which hydrocarbons are extracted) thereby achieving enhanced oil recovery.

The injection of $CO_2$ specifically for the purpose of increasing hydrocarbon production, known as Enhanced Oil Recovery (EOR) or "assisted recovery", is described, for example, in US 2002/0036086. As described in this document, $CO_2$ recovered from a production well can be reinjected via an injection well to reduce the viscosity of the petroleum in place in a formation, increasing its mobility and facilitating its recovery. However, the produced $CO_2$ comprises a number of hydrocarbon impurities which affect the saturation pressure of the formation. The process of US 2002/0038086 is directed to a process for removal of such components from the produced $CO_2$ prior to its reinjection. Further, US 2002/0036086 teaches that sequestration of $CO_2$, which inherently occurs in such a process, is actually a drawback of the process, resulting in a "loss" of $CO_2$ and requiring addition of further $CO_2$.

Although $CO_2$ injection in hydrocarbon reservoirs is therefore known for both enhanced oil recovery and for $CO_2$ storage, in general the requirements for $CO_2$ storage compared to $CO_2$ use for enhanced oil recovery are significantly different.

Thus, for enhanced oil recovery, as taught by US 2002/0036086, any $CO_2$ storage that occurs is considered a "loss" and is a disadvantage. In contrast, in $CO_2$ sequestration it is desirable for as much of the injected $CO_2$ as possible to remain in the reservoir.

Thus, in general, $CO_2$ which it is desired to sequester should be in a form which is not miscible with the hydrocarbons in the reservoir, whilst the opposite is true for $CO_2$ injected for the purpose of enhanced oil recovery. Similarly, it is desired that $CO_2$ for sequestration is in a state which maximises storage, in particular being in the form of a high density material that has the maximum number of moles of $CO_2$ per unit volume. In contrast in enhanced oil recovery it is generally desired to achieve recovery using the minimum volume of $CO_2$ effective for the purpose.

Further, the quantities of $CO_2$ involved in disposal by injection into a hydrocarbon reservoir are immense, generally of the order of millions of tonnes, and significantly more than the amounts involved in enhanced oil recovery. Not least because of the very large volumes involved the injection facility must be capable of reliably injecting the imported $CO_2$. In other words, there must be continuous injection availability for all of the imported $CO_2$. Furthermore, the reservoir must securely store the injected $CO_2$, generally, for a period of time of at least 1000 years.

In general, it would be desired, if possible, that injected $CO_2$ for sequestration is introduced into the reservoir at a significant distance from any production well and in a form which is not miscible with the hydrocarbons therein to maximise the storage capacity and minimise the transport of the injected $CO_2$ to the production well. However, the distance of any injection wells from any production wells may be limited, for example by infrastructure limitations. In any case, with time the large volume of injected $CO_2$ will start to result in an increase in the amount of produced vapour comprising carbon dioxide recovered from the production well. This $CO_2$ can have a beneficial effect on oil recovery, but in the process of the present invention, enhanced hydrocarbon recovery is of lower priority than reliably maintaining $CO_2$ injection availability and securely storing the injected $CO_2$.

Further, the increased amount of produced $CO_2$ with time must be dealt with. Although production wells will often have associated gas injection wells for the purpose of injection of produced vapour comprising $CO_2$, even in the absence of $CO_2$ sequestration, the increasing quantities of vapour comprising $CO_2$ resulting from $CO_2$ sequestration in the reservoir may saturate such facilities, leading to the requirement for more injection wells to be drilled and the cost associated therewith, all for a reservoir that may be well past its peak production.

SUMMARY OF THE INVENTION

It has now been found that by converting the produced vapour stream, that is to be recycled to the hydrocarbon reservoir, from a vapour state into a dense phase state, that the resulting stream may be mixed with the imported $CO_2$ stream that is in either a liquid state or supercritical state thereby forming a co-injection stream that is in a dense phase state. The co-injection stream may then be pumped down one more injection wells where it is injected under pressure into the hydrocarbon reservoir.

Thus, according to the present invention there is provided a method of storing $CO_2$ in a porous and permeable hydrocarbon reservoir having at least one injection well and at least one production well penetrating said reservoir, which method comprises the steps of:

(a) recovering a produced fluid stream comprising produced hydrocarbons, produced water, and produced $CO_2$ from the production well;

(b) passing the produced fluid stream to a production facility where a produced vapour stream comprising carbon dioxide and volatile hydrocarbons is separated from the produced fluid stream;

(c) compressing the produced vapour stream to above the cricondenbar for the composition of the produced vapour stream;

(d) cooling the compressed stream thereby forming a cooled stream that is in a dense phase state;

(e) importing a $CO_2$ stream to an injection facility wherein the imported $CO_2$ is either in a liquid state or a supercritical state;

(f) mixing the cooled stream from step (d) with the imported $CO_2$ stream thereby forming a co-injection stream; and (g) injecting the co-injection stream into the hydrocarbon bearing reservoir from said injection well.

The produced vapour stream is of multi-component composition. Accordingly, the compressed stream, the cooled stream and the co-injection stream also have multi-component compositions.

The term "dense phase state" refers to a multi-component composition that has no definite volume or interface characteristics. Accordingly, a dense phase state fluid behaves similarly to a gas in that it will expand to fill a container in which it is placed. However, a dense phase fluid will have physical properties similar to those of a liquid. In particular, a dense phase fluid will have a density similar to that of a liquid. Accordingly, a dense phase fluid may be pumped to a higher pressure and a column of a dense phase fluid in an injection well will have a significant static head. Further, the dense phase $CO_2$ is a state that has a large number of moles of $CO_2$ per unit volume. Also, as there are no interface characteristics, it is implicit that a dense phase fluid will be single phase.

The hydrocarbon reservoir may be an oil reservoir or a gas condensate reservoir and is any geological structure, strata, oil sand, reservoir rock etc in which oil or gas condensate has naturally accumulated. Preferably, a plurality of injection wells penetrate the hydrocarbon reservoir. Preferably, a plurality of production wells penetrate the hydrocarbon reservoir.

Preferably, the hydrocarbon reservoir is a reservoir of an oil field. Typically, the oil field may have more than one oil reservoir. Generally, to effectively and economically store $CO_2$ in an oil field, the field should be large enough to have original oil in place of more than five million barrels. Preferably, the oil field should be in an area with an existing infrastructure of distribution pipelines that may be used for delivery of the imported $CO_2$ stream. Typically, the oil field should have an injection facility and injection pipelines for a plurality of injection wells.

The method of the present invention is particularly beneficial where an existing oil field is nearing the end of its production life (a depleted oil field). At the time that recovery of the produced fluid stream comprising produced hydrocarbons, produced water (connate water and any previously injected water) and produced $CO_2$ from the production well ceases, injection of the co-injection stream will also cease and the emplaced volume of $CO_2$ will be sequestered. Production of hydrocarbons and water from the oil reservoir, during injection of the co-injection stream, is essential to create space for the $CO_2$ that is to be stored in the reservoir. If there was no production of hydrocarbons and water from the oil reservoir, the reservoir pressure would build up to the original reservoir pressure over a relatively short period of time, for example, 2 to 5 years, and the amount of $CO_2$ that can be sequestered is consequently reduced.

The method of the present invention may be used where the hydrocarbon reservoir is penetrated by a plurality of existing gas injection wells and/or "water alternating gas" (WAG) injection wells and hence there is existing gas injection capacity at the injection facility. However, the existing gas injection capacity may be limited owing to the cost of providing additional compressors and coolers, space and weight constraints, particularly on a platform, or limited gas turbine capacity (for providing electricity to drive the gas injection compressors). Accordingly, an advantage of the present invention is that an amount of produced vapour stream that is in excess of the existing gas injection capacity at the injection facility may be recycled to the reservoir by being converted from a vapour state into a dense phase state before being mixed with the imported $CO_2$ stream. Accordingly, there is no requirement to increase the gas injection capacity of the existing injection facility. Typically, converting the excess produced vapour stream from a vapour state into a dense phase state increases the gas handling capacity of the production and injection facilities by up to 250 millions of standard cubic feet of produced vapour per day (mmscfs/d)(7 million cubic metres of produced vapour per day). Typically, the total amount of produced vapour stream that is to be recycled to the reservoir is at least 100 millions of standard cubic feet of produced vapour per day (mmscf/d) (2.8 million cubic metres of produced vapour per day). Thus, a portion of the produced vapour stream (in an amount that is up to the existing gas injection compressor capacity) may be injected in a vapour state into one or more of the existing gas and/or WAG injection wells using the existing gas injection compressor(s). The remainder of the produced vapour stream is converted from a vapour state into a dense phase state before being mixed with the imported $CO_2$ stream thereby forming the co-injection stream. The co-injection stream may then be injected down one or more existing water injection wells and/or into one or more injection wells that have been specifically designed for the injection of the co-injection stream. However, it is envisaged that one or more of the existing gas injection wells and/or WAG injection wells, may be switched to the injection of the co-injection stream thereby increasing the number of injection wells that are available for injecting the co-injection stream.

It is also envisaged that injection of the produced vapour stream in the vapour state may be eliminated. Thus, the existing gas injection capacity may not be utilized and substantially all of the produced vapour stream that is to be recycled to the reservoir is converted into a dense phase state before being mixed with the imported $CO_2$ stream. The present invention may therefore allow all of the existing gas injection wells and/or existing WAG injection wells to be switched to injection of the co-injection stream thereby providing increased assurance that the imported $CO_2$ may be reliably injected into the reservoir. Thus, there is greater flexibility in the event that one or more (but not all) of the injection wells are shut-in, for example, for maintenance.

Yet a further advantage of the present invention is that it is possible to handle the large amounts of the produced vapour stream that must be recycled to the reservoir in the absence of any existing gas injection capacity and existing gas injection wells. Thus, it is envisaged that substantially all of the produced vapour stream may be compressed and cooled before being mixed with the imported $CO_2$ stream and all of the injection wells that penetrate the hydrocarbon reservoir (for example, existing water injection wells and/or injection wells that have been specifically designed for the injection of the co-injection stream) are dedicated to the injection of the co-injection stream.

In addition, a further advantage of the present invention is that compressing and cooling the produced vapour stream (thereby converting the produced vapour stream from a vapour state into a dense phase state) and mixing the resulting cooled stream with the imported $CO_2$ (that is in a liquid state or supercritical state) reduces the injection costs compared with the separate injection of an imported $CO_2$ stream (in a liquid state or supercritical state) and a compressed produced vapour stream into liquid and gas injection wells respectively. This is because the down-hole pressure in an injection well has two components: (a) the well-head pressure and (b) the static head or the weight of the column of fluid in the injection well. The static head of a column of a dense phase fluid in an injection well is significantly higher than that of a column of vapour. Accordingly, the well-head pressure for the co-injection stream is lower than the well-head pressure for a compressed produced vapour stream. Furthermore, the cost of compressing a vapour stream to a higher pressure is greater than the cost of pumping a dense phase stream to a higher pressure.

A further advantage of the present invention is that injection of the co-injection stream into the hydrocarbon reservoir may result in enhanced recovery of liquid hydrocarbons (oil or gas condensate) therefrom. Enhanced recovery of oil may arise owing to improved sweep efficiency of the dense phase co-injection stream compared with using water as the displacement fluid since the dense phase co-injection stream has a similar viscosity to oil and is therefore less likely to by-pass or finger-through the oil than water. In addition, enhanced recovery of oil may arise owing to the dense phase co-injection stream dissolving oil from the surface of the reservoir rock. Enhanced recovery of gas condensate may arise where the co-injection stream is injected into the lower portion of the gas condensate reservoir.

Where the produced vapour stream has a low $CO_2$ content of less than 15% by volume, a portion of the produced vapour stream may be used as fuel gas for the production and injection facilities, for example, as fuel gas for one or more electric generators. However, as the concentration of $CO_2$ in the produced vapour stream increases with time this will result in a decrease in the calorific value of the produced vapour stream. Accordingly, a fuel gas may be formed by passing the produced vapour stream (for example, having a $CO_2$ content in excess of 50% by volume or in excess of 75% by volume) through a membrane module to separate a fuel gas having a $CO_2$ content of below 15% by volume. Where the $CO_2$ content of the produced vapour stream is above 75% by volume this will require the processing of a large volume of produced vapour stream. For example, the amount of the produced vapour stream that is used to generate the fuel gas may be in the range of 5 to 10 millions of standard cubic feet of vapour per day (mmscf/d) (0.14 to 0.28 million cubic metres of vapour per day). The reject stream that is enriched in $CO_2$ may be recombined with the remainder of the produced vapour stream prior to compressing the produced vapour stream in step (c) of the present invention. An advantage of recombining the reject stream with the remainder of the produced vapour stream is that the cooled stream that is formed in step (d) will have a higher molecular fraction of $CO_2$. Accordingly, the cooled stream will be of a higher density (than in the absence of recombining the reject stream with the produced vapour stream). Accordingly, the co-injection stream will also be of a higher density and the down-hole pressure will have a higher contribution from the static head of the column of co-injection stream in the injection well.

The imported $CO_2$ stream may be a by-product stream from a power station (for example, is recovered from a flue gas) or may be a by-product from a hydrogen plant (for example, is separated from a stream comprising hydrogen and carbon dioxide where the hydrogen is subsequently used to generate electricity in a power station). The imported $CO_2$ stream may also have been derived from a natural gas plant where $CO_2$ is separated from a natural gas product stream. In addition, the imported $CO_2$ may be a by-product of the manufacture of ammonia.

The imported $CO_2$ stream preferably comprises at least 98% $CO_2$ on a dry basis. Thus, the imported $CO_2$ stream may comprise trace amounts of additional components selected from hydrogen, carbon monoxide, nitrogen and mixtures thereof. For example, where the imported $CO_2$ stream is obtained from a hydrogen plant, the additional components are mostly hydrogen and carbon monoxide. Typically, the amount of hydrogen in the imported $CO_2$ stream is less than 1% by weight.

Although the imported $CO_2$ stream is not a single component stream, the amount of impurities in the imported $CO_2$ stream is so low that the phase behaviour of this stream is similar to that of pure $CO_2$. Accordingly, the imported $CO_2$ may be regarded as being either in a liquid or a supercritical state. By "supercritical state" is meant that the imported $CO_2$ has a pressure above the critical pressure for pure $CO_2$ and a temperature above the critical temperature for pure $CO_2$. Thus, compressing pure $CO_2$ at a temperature just below its critical temperature of 31.1° C. liquefies the gas at a pressure of approximately 73.8 bar (7.4 MPa) absolute. However, compressing $CO_2$ at or above its critical temperature and critical pressure increases its density to a liquid-like state but does not effect a phase change. At or above the critical point, $CO_2$ is termed a supercritical fluid. Although supercritical $CO_2$ can be compressed to a range of liquid like densities and can therefore be pumped, it retains the diffusivity of a gas and will expand to fill a container in which it is placed.

The imported $CO_2$ stream is preferably sent by pipeline to the injection facility. The pipeline may be an existing gas export pipeline that has been switched to importing the $CO_2$ stream to the injection facility. Where the imported $CO_2$ stream arrives by pipeline, the $CO_2$ is generally at ambient temperature, which in the case of a subsea pipeline will be the average temperature of the seabed (2 to 7° C., for example 4 to 6° C.). The pressure of the $CO_2$ that is flowing through the pipeline is preferably in the range of 75 to 250 bar (7.5 to 25 MPa) absolute, preferably, 100 to 200 bar (10 to 20 MPa) absolute. Thus, the pressure of the imported $CO_2$ stream will be above the cricondenbar for all compositions of the co-injection stream (irrespective of the molecular fraction of $CO_2$ in the co-injection stream). It is envisaged that the imported $CO_2$ stream may arrive by pipeline at the desired well-head pressure for the co-injection stream. Alternatively, the pipeline pressure of the imported $CO_2$ stream may be below the desired well-head pressure for the co-injection stream. Accordingly, the pressure of the imported $CO_2$ stream may be boosted to the desired well-head pressure prior to being mixed with the cooled stream in step (f). However, it is preferred to mix the imported $CO_2$ stream with the cooled stream at the arrival pressure of the imported $CO_2$ stream and then subsequently boost the pressure of the co-injection stream to the desired well-head pressure. Typically, the imported $CO_2$ will be delivered by pipeline to the injection facility at a rate of at least 5000 tonnes per day (5 million kg per day), preferably, at least 5,500 tonnes/day (5.5 million kg per day). 5,500 tonnes/day equates to a $CO_2$ injection rate of 36 million reservoir barrels per day (mrbd) at typical bottom-hole conditions of a pressure of 7500 psi (52 MPa) and a temperature of 25° C.

It is also envisaged that the imported $CO_2$ may be delivered to the injection facility by tanker (road, rail or ship). Where the $CO_2$ is transported to the injection facility by tanker, the $CO_2$ will generally be in a liquid state. The tanker typically comprises a pressurized container for the liquid $CO_2$, a cargo discharge pump within said container for pumping the $CO_2$ out of the container along a conduit to the injection facility (thereby providing the imported $CO_2$ stream). Typically, an external booster pump is also provided for pumping the imported $CO_2$ stream to the injection facility. The $CO_2$ that is transported by tanker is generally refrigerated otherwise the pressures required to maintain the $CO_2$ in the liquid state are high making the required wall thicknesses of the pressurized containers high and therefore prohibitively expensive. Typically, for large scale transportation of $CO_2$ by tanker, the optimum temperature for the liquid state $CO_2$ will be in the range of −55 to −48° C., preferably −57 to −40° C.; and the pressure will be 5.2 to 10 bar (0.52 to 1 MPa) absolute, preferably, 5.5 to 7.5 bar (0.55 to 0.75 MPa) absolute. This corresponds to the position in the phase diagram for pure $CO_2$ which is just above the triple point in terms of temperature and pressure. The triple point for pure $CO_2$ is 5.2 bar (0.52 MPa) absolute and −56.6 C. Typically, the imported $CO_2$ stream is pumped to a pressure of 30 to 70 bar (3 to 7 MPa) absolute as it leaves the storage container, corresponding to a temperature of −50 to 0° C. The imported $CO_2$ stream may then be pumped to the desired well-head pressure before being mixed with the cooled stream in step (f) thereby forming the co-injection stream. Alternatively, the imported $CO_2$ stream may be mixed with the cooled stream in step (f) at below the desired well-head pressure but at a pressure above the cricondenbar for the co-injection stream. The co-injection stream is then boosted to the desired well-head pressure. Transportation of $CO_2$ in a liquid state via tanker at sub-ambient temperatures is expensive since refrigeration is required. Also, there is a risk that refrigeration of the $CO_2$ may result in the formation of solid $CO_2$. Accordingly, transportation by pipeline is preferred.

Where the co-injection stream is formed at below the desired well-head pressure, the co-injection stream may be fed to an injection pump or pumps (e.g. one, two, three or four pumps in series) of the injection facility to bring it to the desired well-head pressure, desirably about 100 to 350 bar (10 to 35 MPa), in particular, 150 to 300 bar (15 to 30 MPa) absolute. It is also envisaged that the pressure of the co-injection stream may be further boosted downhole in the injection well, for example, using a downhole electric submersible pump.

As is well known to the person skilled in the art, the average pressure of a hydrocarbon reservoir (and hence the required down-hole pressure for injecting the co-injection stream into the hydrocarbon reservoir) varies depending upon the depth of the reservoir and the type of rock, among other things. For example, the down-hole pressure will be higher the deeper the hydrocarbon reservoir. Generally stated, the average pressure of the hydrocarbon reservoir is controlled by the pressure on the injection well and the pressure of the production well. Generally, the down-hole pressure in the injection well is at least 200 psi (1.4 MPa) above the average pressure of the hydrocarbon reservoir, for example, 200 to 500 psi (1.4 to 3.4 MPa) above the average pressure of the hydrocarbon reservoir thereby ensuring that the co-injection stream is injected into the reservoir. However, certain reservoirs exhibit thermal fracturing behaviour where injectivity of a fluid into a reservoir increases when the pressure of the injection fluid is above a fracture opening pressure. Thus, fractures in the reservoir open and close depending upon the injection pressure. Accordingly, it may be necessary to increase the injection pressure of the co-injection stream to above the fracture opening pressure which may be at least 500 psi (3.4 MPa) higher, for example, at least 800 psi (5.5 MPa) higher than the average reservoir pressure.

A hydrocarbon reservoir will generally comprise a hydrocarbon-bearing rock formation with a water-bearing rock formation (aquifer) located underneath (due to the higher density of water). Typically, the aquifer is in fluid communication with the hydrocarbon-bearing formation. In the process of the present invention the co-injection stream may be introduced into the hydrocarbon-bearing formation and/or into the underlying aquifer, preferably as far as possible from any production wells that penetrate the hydrocarbon-bearing formation to minimise transport of the $CO_2$ to the production well. Thus, the injection well may penetrate both the hydrocarbon-bearing formation and the underlying aquifer. An advantage of introducing the co-injection stream into the underlying aquifer is that $CO_2$ has high solubility in the aquifer water and so a large amount of $CO_2$ can be stored therein. Further, the introduction of the $CO_2$ into the aquifer results in an increase in pressure which aids production of hydrocarbon from the hydrocarbon-bearing formation.

As noted previously, it is generally desired, as far as possible, that the co-injection stream is introduced into the reservoir at a significant distance from any production well to minimise the transport of the injected $CO_2$ to the production well. The ability to maximise the distance of the injection of the co-injection stream from any production well may depend on the structure and location of the hydrocarbon reservoir, and in particular the number and arrangement of injection and production wells. In general, the most effective storage of $CO_2$ is achieved by injecting the co-injection stream using an injection well at the flanks of a reservoir (the periphery). Where a hydrocarbon reservoir is not flat-lying the injection well preferably introduces the co-injection stream into a low-lying point of the reservoir, for example the base, of the reservoir ("downdip").

On land-based hydrocarbon reservoirs an arrangement of production and injection wells is commonly employed in oil production, for example a geometric arrangement known as a "pattern flood" where a plurality of production and injection wells are provided such that each production well has as its nearest neighbours a plurality of injection wells, and vice versa. For example, a production well may be serviced by six injection wells arranged in an approximately hexagonal configuration about the production well. Each injection well may have, as its nearest neighbours, three production wells. This configuration may be repeated across the hydrocarbon reservoir for the number of production wells required. In such a configuration, using an injection well for injecting the co-injection stream that is not surrounded by production wells is preferable, for example one located at the edge of the arrangement, such that not all of the $CO_2$ injected in the co-injection stream flows towards production wells. Further improvements when injecting the co-injection stream into injection wells which are part of a pattern flood may be achieved by shutting in wells (both injection and production wells) to optimise the $CO_2$ storage by maximising the reservoir volume between an injection well and production well.

For off-shore hydrocarbon reservoirs there are generally far fewer injection wells owing to drilling costs, so the operator may have less flexibility, but again it will generally be best to inject the co-injection stream into the periphery of the reservoir (as far as possible), and preferably at a low point of the reservoir, to maximise the distance between the injection well and the production well.

Preferably, the $CO_2$ will be stored in the reservoir for at least 1000 years. Accordingly, the down-hole pressure of the co-injection stream should be such that the pressure in the reservoir does not exceed the reservoir overburden pressure. A pressure greater than the reservoir overburden pressure would result in the cracking and rupturing of the reservoir, and in the consequent leakage of $CO_2$. Accordingly, $CO_2$ could no longer be stored long-term in the reservoir. Towards the end of the life of the hydrocarbon reservoir, it may be preferred to reduce the pressure in the reservoir to below the original reservoir pressure before the injection and production wells are capped. This reduces the risk of the stored $CO_2$ being released to the environment if one of the caps was to fail. Thus, fluids from surrounding formations will invade the reservoir and will hold the $CO_2$ in place in the reservoir.

The volatile hydrocarbons in the produced vapour stream that is separated in step (b) include methane, ethane, propanes and butanes. Thus, as discussed above, the produced vapour stream, the compressed stream, the cooled stream and the co-injection stream are all multi-component streams. Furthermore, the composition of the produced vapour stream and hence the composition of the compressed stream, the cooled stream and the co-injection stream will vary with time during the operation of the process of the present invention (owing to the molecular fraction of $CO_2$ in the produced vapour stream increasing with time). Thus, prior to injection of the $CO_2$ into the reservoir, the amount of $CO_2$ that is present in the produced vapour stream (naturally occurring $CO_2$) may be in the range of, for example, 5 to 25% by volume. After commencing the process of the present invention, the amount of $CO_2$ in the produced vapour stream will increase (over several years) to an amount in the range of 70 to 95%, for example, 80 to 90% by volume.

Accordingly, it is preferred that the produced vapour stream is pressurised in step (c) to a pressure that is above the cricondenbar for all compositions of the produced vapour stream (and hence for all compositions of the compressed stream and cooled stream) that may arise during the operation of the process of the present invention (irrespective of the molecular fraction of $CO_2$ in these streams). Also, the pressure of co-injection stream is preferably selected to be above the cricondenbar for all compositional changes of the co-injection stream that arise during the operation of the process of the present invention (irrespective of the molecular fraction of $CO_2$ in the co-injection stream). Where the imported $CO_2$ stream is at a pressure above the cricondenbar for the composition of the produced vapour stream, it is preferred that the produced vapour stream is compressed to the pressure of the imported $CO_2$ stream.

The compressed stream is cooled to remove heat of compression thereby forming a cooled stream that is in a dense phase state. Typically, the compressed stream is cooled against a coolant in a heat exchanger, for example, against water. It is essential that the pressure is maintained at above the cricondenbar during this cooling step so as to avoid the risk of forming a two phase composition. Preferably, the compressed stream is cooled without any substantial reduction in its pressure. However, a pressure drop of up to 5 bar (0.5 MPa), preferably, up to 3 bar (0.3 MPa), may be tolerated provided that the pressure remains above the cricondenbar.

Generally, the temperature of the cooled stream is below the cricondentherm for all compositional changes of the compressed stream (irrespective of the molecular fraction of $CO_2$). Thus, with reference to FIG. 1, a generic phase diagram for a multi-component composition, the area that is above the cricondenbar and to the right of the cricondentherm is generally regarded as vapour while the area that is above the cricondenbar and to the left of the cricondentherm is generally regarded as dense phase. The density of a dense phase fluid increases with decreasing temperature. Accordingly, the compressed stream is preferably cooled to below the temperature at the critical point for all composition changes of the compressed stream (irrespective of the molecular fraction of $CO_2$). Typically, the cooled stream is at a temperature of less than 40° C., preferably, less than 30° C., for example, in the range of 10 to 40° C., preferably 20 to 30° C., in particular 20 to 25° C.

As discussed above, the temperature of the imported $CO_2$ stream, when delivered by subsea pipeline, is in the range of 2 to 7° C. Accordingly, the temperature of the co-injection stream will be intermediate between the temperature of the imported $CO_2$ stream and the temperature of the cooled stream. Typically, the temperature of the co-injection stream will be within the range of 5 to 15° C., for example, 12 to 15° C., depending upon the amount of compressed and cooled stream that is mixed with the imported $CO_2$ stream. It is observed that the ratio of the cooled stream (from step (d)) to imported $CO_2$ stream will increase with time owing to increasing amounts of injected $CO_2$ being produced from the hydrocarbon reservoir thereby resulting in increasing amounts of produced vapour stream that must be recycled to the reservoir. Typically, the two streams are mixed to form the co-injection stream in a ratio such that the mole % of $CO_2$ in the co-injection stream is at least 70 mole %, preferably, at least 80 mole %, more preferably, at least 85 mole %. Typically, the cooled stream is mixed with the imported $CO_2$ stream to form the co-injection stream at a rate of 50 to 200 mmscf/d (1.4 to 5.6 million cubic metres per day), preferably 75 to 200 mmscf/d (2.1 to 5.6 million cubic metres per day) (based upon the produced vapour stream from which the cooled stream is derived).

It is envisaged that the mixing of the imported $CO_2$ stream with the cooled stream may occur at an injection facility located on a platform where the hydrocarbon reservoir is offshore or at an injection facility located on land where the hydrocarbon reservoir is located beneath land or is close to shore.

Typically, the cooled stream and imported $CO_2$ stream are mixed using an in-line mixing device. For example, the mixing device has an inlet for the imported $CO_2$ stream, an inlet for the cooled stream and an outlet for the co-injection stream. The mixing device may have, for example, a static mixer or propeller type mixer that allows the two streams to be homogenously mixed to form the co-injection stream. Typically, the co-injection stream is then sent to a manifold that can divert the co-injection stream to one or more injection wells and into the reservoir.

The cooled stream formed in step (d) cannot be two-phase as the pressure is above the cricondenbar for the composition of the produced vapour stream. The cooled stream is in a dense phase state (has liquid-like properties). Accordingly, the cooled stream and the imported $CO_2$ stream (that is in either in a liquid or supercritical state) have high miscibility and rapidly form a single homogeneous phase when they are mixed to form the co-injection stream.

Also, the co-injection stream formed in step (f) cannot be two-phase as the pressure is above the cricondenbar for the composition of the co-injection stream. Accordingly, there is no risk of a vapour phase separating from the co-injection stream in the injection well and hence no risk of slug flow in the injection well.

Typically, at least one tubular is arranged in the injection well in sealing engagement with the wall thereof. Typically, the tubular(s) is run into the injection well to a position adjacent the hydrocarbon reservoir into which the co-injection stream is to be injected. It is envisaged that the tubular(s) in the injection well(s) that is employed for injection of the co-injection stream may have an internal diameter in the range of 3 to 12 inches (7.6 to 30.5 cm), preferably 4 to 8 inches (10.2 to 20.3 cm), in particular, 4.5 to 7 inches (11.4 to 17.8 cm). However, where the cooled stream is mixed with the imported $CO_2$ stream at a low rate, it may be necessary to use smaller diameter tubing, for example, tubing having an internal diameter of 4.5 inches (11.4 cm).

Where a reservoir has thermal fracturing characteristics it may be necessary to increase the diameter of the tubing in the injection well in order that a sufficient volume of the co-injection fluid can be injected into the reservoir to maintain cooling of the reservoir rock. Thus, the co-injection stream will have a lower heat capacity than water (for example, pure liquefied $CO_2$ has a specific heat capacity that is about half that of water). Also, the co-injection stream typically has a well-head injection temperature of about 12° C. compared with about 4 to 7° C. for injected water. Therefore higher injection rates are required to maintain cooling of the reservoir and thereby prevent fractures from closing up.

The produced fluid stream may be passed to the production facility using a conventional flow line or riser. The production facility may be at an onshore terminal, an offshore platform or a floating structure including a floating production, storage and off-take facility (FPSO). The production facility typically comprises a gas-liquid separation stage for separating the produced vapour stream from the produced fluid, a liquid hydrocarbon-water separation stage for separating a liquid hydrocarbon stream (e.g. crude oil) from a produced water stream, a compression stage for compressing the separated vapour stream, and a cooling stage for cooling the compressed stream.

Typically, the produced fluid arrives at the production facility at an elevated temperature, for example, a temperature of 35 to 100° C., in particular, 75 to 100° C., for example, 90 to 100° C. However, the precise temperature of the produced fluid will depend on the depth of the hydrocarbon reservoir and the amount of cooling of the produced fluid as it passes to the surface through the production well (and through any risers, pipelines etc).

Typically, the produced fluid is reduced in pressure before being fed to the gas-liquid separation stage of the production facility where a vapour stream comprising volatile hydrocarbons and carbon dioxide is separated from the produced fluid in at least one gas-liquid separator. Preferably, a plurality of gas-liquid separator vessels are arranged in series, for example, 2 to 4, gas-liquid separator vessels. The process of the present invention will now be illustrated by reference to 2 gas-liquid separator vessels arranged in series. Suitably, a vapour stream is removed overhead from at or near the top of the first gas-liquid separator vessel in the series. Suitably, the vapour stream leaves the first gas-liquid separator vessel at a pressure in the range of 30 to 50 bar (3 to 5 MPa) absolute, for example 35 to 45 bar (3.5 to 4.5 MPa) absolute. Typically, the vapour stream leaves the first gas-liquid separator vessel at a temperature in the range of 35 to 100° C., for example, 75 to 100° C., in particular, about 90° C. The vapour stream is subjected to cooling to a temperature of about 25 to 30° C. in a heat exchanger, by heat exchange with a coolant, for example, a mixture of water and a glycol, so that liquid condenses out of the vapour stream and is separated in the second gas-liquid separator vessel of the series. The produced vapour stream is removed overhead from at or near the top of the second gas-liquid separator vessel. The produced vapour stream is preferably dehydrated, for example, by being passed through at least one dehydration bed (formed from, for example, a molecular sieve or a silica gel). A portion of the produced vapour stream may by-pass the dehydration bed before being recombined with the dehydrated vapour. This is advantageous as dehydration is a potential vapour handling capacity bottleneck. However, the amount of water in the produced vapour stream should be less than 50 ppm v/v for injection well integrity reasons (for example, for corrosion control). While reducing the pressure of the produced fluid is in most cases adequate for driving off the volatile hydrocarbons and $CO_2$ from the produced liquid hydrocarbons and produced water, the produced fluid that is fed to the gas-liquid separator vessel(s) of the production facility may be heated to effect more rapid and complete release of the volatile hydrocarbons and $CO_2$ from the produced liquid hydrocarbons and produced water.

The produced vapour stream is then passed to the compression stage of the production facility where the vapour stream is compressed to above the cricondenbar for the composition of the produced vapour stream thereby forming the compressed stream. Typically, at least one low pressure compressor, preferably, two or three low pressure compressors are used to pressurise the vapour stream. The compressed stream is at a higher temperature than the produced vapour stream owing to the heat of compression. The compressed stream is then cooled in the cooling stage of the production facility, typically, in a heat exchanger, for example, by heat exchange with water, to form a cooled compressed stream that is in a dense phase state (see above).

A liquid stream comprising a mixture of liquid hydrocarbons and water is withdrawn from at or near the bottom of each of the gas-liquid separator vessels of the gas separation stage of the production facility. These liquid streams are combined and the combined liquid stream is passed to the liquid hydrocarbon-water separation stage of the production facility where the combined liquid stream is separated into a liquid hydrocarbon stream and an aqueous stream. The liquid hydrocarbon-water separation stage typically comprises at least one liquid-hydrocarbon water separator vessel, preferably, a plurality of liquid-hydrocarbon water separation vessels arranged in series. The operation of liquid hydrocarbon-water separation vessel(s) is well known to the person skilled in the art. Any produced vapour that separates from the combined liquid stream in the liquid hydrocarbon-water separation stage may either be employed as fuel gas or may be combined with the produced vapour stream from the gas-liquid separation stage.

Where it is proposed to make use of an existing gas injection capacity, a portion of the compressed stream (in an amount up to the gas injection capacity of the injection facility) is passed to at least one gas injection compressor. The gas injection compressor(s) is a high pressure compressor(s) that is capable of boosting the pressure of the compressed stream to the desired well-head pressure for a gas injection well (thereby forming an injection stream that is in a vapour state). The well-head pressure for a gas injection well will be dependent on the reservoir pressure. Typically, the well-head pressure is in the range of 250 to 450 bar (25 to 45 MPa) absolute, for example, 350 to 400 bar (35 to 40 MPa) absolute. The injection stream is in a vapour state owing to the heat of compression. Thus, with reference to the phase diagram for a generic multi-component composition (FIG. 1), the heat of compression will result in injection stream having a temperature to the right of the cricondentherm. Accordingly, as discussed above the injection stream is regarded as vapour even though the pressure is above the cricondenbar.

As discussed above, the co-injection stream is in a dense phase state. Thus, the temperature of the co-injection stream is less than the temperature at the cricondentherm, more preferably, is less than the temperature at the critical point for the composition of the co-injection stream.

Where an injection well has been shut-in and the column of co-injection fluid in the injection well has warmed up to the geothermal gradient, it may be necessary to re-start the injection well using the imported $CO_2$ stream, with additional pumping, owing to the reduced gravity head in the injection well. Injection of the co-injection stream is re-started after the warmed column of fluid has been displaced into the reservoir using the imported $CO_2$ stream.

Alternating injection of the co-injection fluid with injection of water (where more than one injection well is available) may be advantageous in the early stages of $CO_2$ injection. Suitably, the injected water may be produced water that is separated from produced liquid hydrocarbons in the liquid hydrocarbon-water separator(s). In later stages, injection of water is to be avoided as the water will take up space that is required for $CO_2$ sequestration.

BRIEF DESCRIPTION OF THE DRAWINGS

The process of the present invention will now be described with reference to the following Examples and by reference to the accompanying drawings, in which:

FIG. 1 is a phase diagram for a generic multi-component composition; and

FIG. 2 is a schematic illustrating an imported $CO_2$ stream passed to a mixer via a pump.

DETAILED DESCRIPTION OF PREFERRED EMBODIMENTS

FIG. 1 illustrates a phase diagram for a generic multi-component composition.

The region inside the phase diagram is two phase. The region to the left of the phase diagram is liquid, the region to the right of the phase diagram is vapour, the region inside the phase diagram is two phase, and the region above the phase diagram (above the cricondenbar) is dense phase.

The "cricondenbar" for a multi-component composition is the highest pressure at which two phases can coexist. Thus, where the pressure is above the cricondenbar, a multi-component composition cannot be two-phase (both liquid and vapour).

The "cricondentherm" for a multi-component composition is the highest temperature at which two phases can co-exist.

The "critical point" for a multi-component composition is an experimentally determinable point and is the point (temperature and pressure) on the phase diagram where the mixture properties in the vapour phase and the liquid phase are the same.

The terms "critical point", "cricondentherm" and "cricondenbar" as used herein, refer to the composition of the stream under discussion.

In FIG. 2, an imported $CO_2$ stream 1 is passed to a mixer 2 via a pump 3. A produced vapour stream 4 comprising volatile hydrocarbons and $CO_2$ is compressed in a compressor 5 to the pressure of the imported $CO_2$ stream 1 thereby forming a compressed stream 6 that is at a pressure above the cricondenbar for the composition of the produced vapour stream 4. The compressed stream 6 is then cooled in a heat exchanger 7 against water to a temperature of less than 30° C., preferably 20 to 25° C., thereby forming a cooled stream 8 that is in a dense phase state. The cooled stream 8 is passed to the mixer 2 where it is mixed with the imported $CO_2$ stream 1 to form a co-injection stream 9 that is in a dense phase state. The co-injection stream 9 is a single phase stream and may be injected down an injection well (not shown) and into a hydrocarbon reservoir (not shown).

The invention claimed is:

1. A method of storing CO2 in a porous and permeable hydrocarbon reservoir having at least one injection well and at least one production well penetrating said reservoir, which method comprises the steps of:
   (a) recovering a produced fluid stream comprising produced hydrocarbons, produced water, and produced CO2 from the production well;
   (b) passing the produced fluid stream to a production facility where a produced vapour stream comprising carbon dioxide and volatile hydrocarbons is separated from the produced fluid stream;
   (c) compressing the produced vapour stream to above a cricondenbar for the composition of the produced vapour stream;
   (d) cooling the compressed stream thereby forming a cooled stream that is in a dense phase state;
   (e) importing a CO2 stream to an injection facility wherein the imported CO2 is either in a liquid state or a super-critical state;
   (f) mixing the cooled stream from step (d) with the imported CO2 stream I thereby forming a co-injection stream that is in a dense phase state; and
   (g) injecting the co-injection stream into the hydrocarbon bearing reservoir from said injection well.

2. The method as claimed in claim 1 wherein the hydrocarbon reservoir has a plurality of injection wells comprising (i) at least one gas injection well and/or "water alternating gas" (WAG) injection well, and (ii) at least one water injection well and/or well designed for the injection of the co-injection stream wherein:
   (A) a portion of the produced vapour stream that is separated in step (b) is injected in a vapour state into the gas injection well and/or WAG injection well;
   (B) the remainder of the produced vapour stream that is separated in step (b) is used as feed to step (c); and
   (C) the co-injection stream that is formed in step (f) is injected into the at least one water injection well and/or well that is designed for the injection of the co-injection stream.

3. The method as claimed in claim 1 wherein substantially all of the produced vapour stream that separated in step (b) is used as feed to step (c).

4. The method as claimed in claim 3 wherein the hydrocarbon reservoir has a plurality of existing injection wells selected from gas injection wells, "water alternating gas" (WAG) injection wells, and water injection wells and these existing injection wells are switched to injection of the co-injection stream.

5. The method as claimed in claim 4 wherein the hydrocarbon reservoir has at least one in well that is designed for the injection of the co-injection stream and at least a portion of the co-injection stream is injected into said injection well.

6. The method as claimed in claim 1 wherein injection of the co-injection stream into the hydrocarbon reservoir results in enhanced recovery of liquid hydrocarbons therefrom.

7. The method as claimed in claim 1 wherein the produced vapour stream that is separated in step (b) has a $CO_2$ content of less than 15% by volume and a portion of the produced vapour stream is used as fuel gas for one or more electric generators of the production facility and/or the injection facility.

8. The method as claimed in claim 1 wherein the produced vapour stream that is separated in step (b) has a $CO_2$ content in excess of 50% by volume and at least a portion of the produced vapour stream is used to generate a fuel gas for one or more electric generators of the production and/or the injection facility by passing the portion of the produced vapour stream through a membrane module to separate a fuel gas having a $CO_2$ content of below 15% by volume and a reject stream that is enriched in $CO_2$ and wherein the reject stream is recombined with the remainder of the produced vapour stream prior to compressing the produced vapour stream in step (c).

9. The method as claimed in claim 1 wherein the imported $CO_2$ stream is a by-product that is produced in a power station, a hydrogen plant, a natural gas separation plant, or an ammonia plant.

10. The method as claimed in claim 1 wherein the imported $CO_2$ stream is sent by pipeline to the injection facility wherein the pressure in the pipeline is in the range of 75 to 250 bar (7.5 to 25 MPa) absolute.

11. The method as claimed in claim 1 wherein the imported $CO_2$ stream is delivered to the injection facility by tanker.

12. The method as claimed in claim 1 wherein the imported $CO_2$ stream is mixed with the cooled stream in step (f) at the arrival pressure of the imported $CO_2$ stream and, if necessary, the pressure of the co-injection stream is subsequently boosted to the desired well-head pressure for the injection well.

13. The method as claimed in claim 1 wherein the co-injection stream is injected into the in well at a pressure in the range of 100 to 350 bar (10 to 35 MPa) absolute.

14. The method as claimed in claim 1 wherein the hydrocarbon reservoir comprises a hydrocarbon-bearing rock formation with a water-bearing rock formation (aquifer) located underneath and in fluid communication with the hydrocarbon-bearing formation, and the co-injection stream is introduced into the water-bearing rock formation (aquifer).

15. The method as claimed in claim 1 wherein the co-injection stream is injected using an injection well at the flanks of a reservoir (the periphery).

16. The method as claimed in claim 1 where a hydrocarbon reservoir is not flat-lying and wherein the co-injection stream is injected into a low-lying point of the reservoir.

17. The method as claimed in claim 1 wherein the compressed stream is cooled in step (d) by passing the compressed stream through a heat exchanger in heat exchange relationship with a coolant.

18. The method as claimed in claim 1 wherein the compressed stream is cooled in step (d) to a temperature in the range of 10 to 40° C.

19. The method as claimed in claim 18 wherein the compressed stream is cooled in step (d) to a temperature in the range of 20 to 30° C.

20. The method as claimed in claim 1 wherein the co-injection stream that is formed in step (f) has a temperature in the range of 5 to 15° C.

21. The method as claimed in claim 1 wherein the imported $CO_2$ stream and the cooled stream from step (d) are mixed in step (f) to form the co-injection stream in a ratio such that the mole % of $CO_2$ in the co-injection stream is at least 70 mole %.

22. The method as claimed in claim 21 wherein the mole % of $CO_2$ in the co-injection stream is at least 80 mole %.

23. The method as claimed in claim 21 wherein the mole % of $CO_2$ in the co-injection stream is at least 85 mole %.

* * * * *